(No Model.)  2 Sheets—Sheet 1.

J. M. DODGE.
FRICTION CLUTCH.

No. 554,583.  Patented Feb. 11, 1896.

Witnesses
R. Schleicher
Will. A. Barr

Inventor:
James M. Dodge
by his Attorneys
Howson & Howson (No Model.) 2 Sheets—Sheet 2.

J. M. DODGE.
FRICTION CLUTCH.

No. 554,583. Patented Feb. 11, 1896.

Witnesses:
R. Schlucher
Will. A. Barr.

Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE LINK-BELT ENGINEERING COMPANY, OF SAME PLACE.

FRICTION-CLUTCH.

SPECIFICATION forming part of Letters Patent No. 554,583, dated February 11, 1896.

Application filed November 5, 1894. Serial No. 527,970. (No model.)

*To all whom it may concern:*

Be it known that I, JAMES M. DODGE, a citizen of the United States, residing in Philadelphia, Pennsylvania, have invented certain Improvements in Friction-Clutches, of which the following is a specification.

The object of my invention is to so construct a friction-clutch that the gripping-levers will be brought to their extreme positions and there locked without materially releasing the grip.

Heretofore in the construction of lever-clutches of this character it has been impossible to lock the lever without releasing the grip to a considerable extent. Consequently the final grip would not be as great as that exerted on the center line prior to locking. By my invention I overcome this difficulty, as fully described hereinafter.

Figure 1:
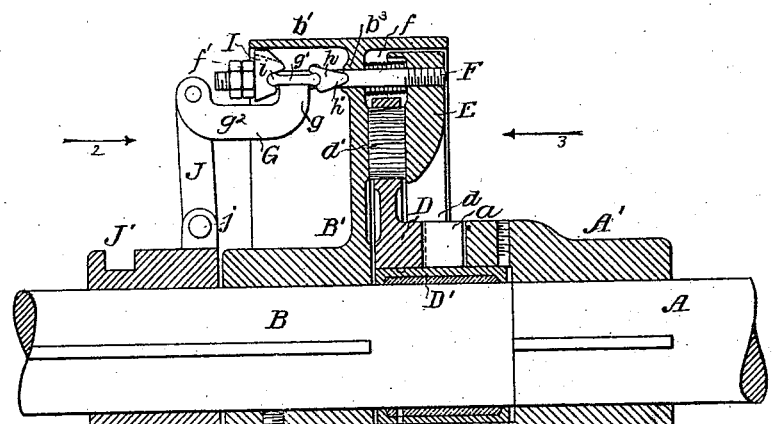
Figure 5:
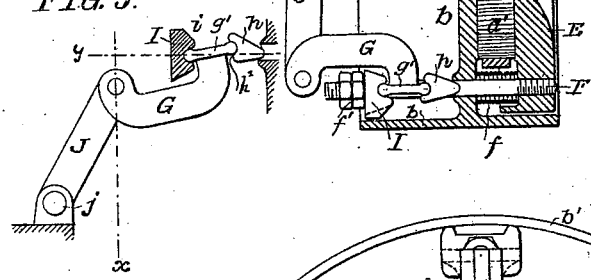
Figure 6:
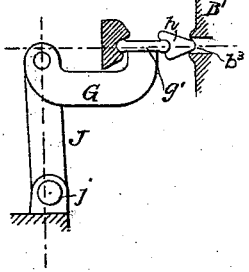
Figure 2:
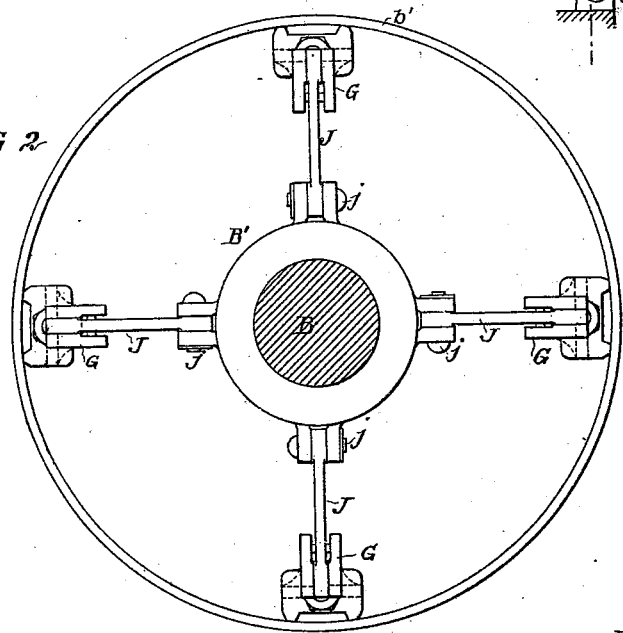
Figure 3:
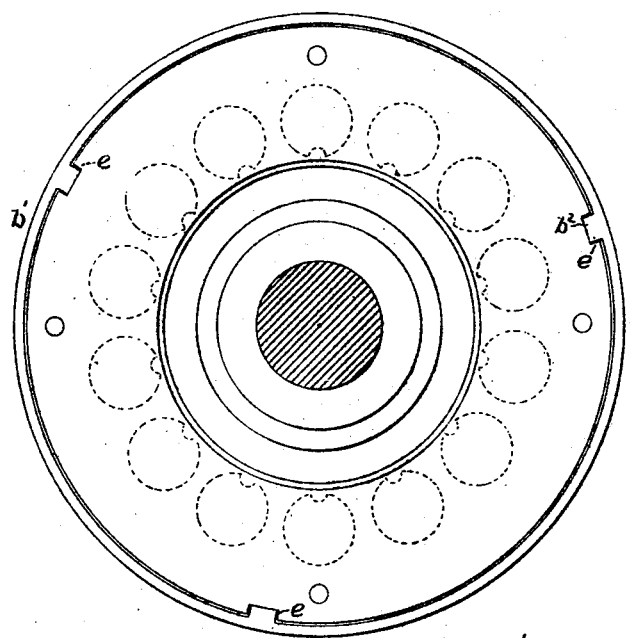
Figure 4:
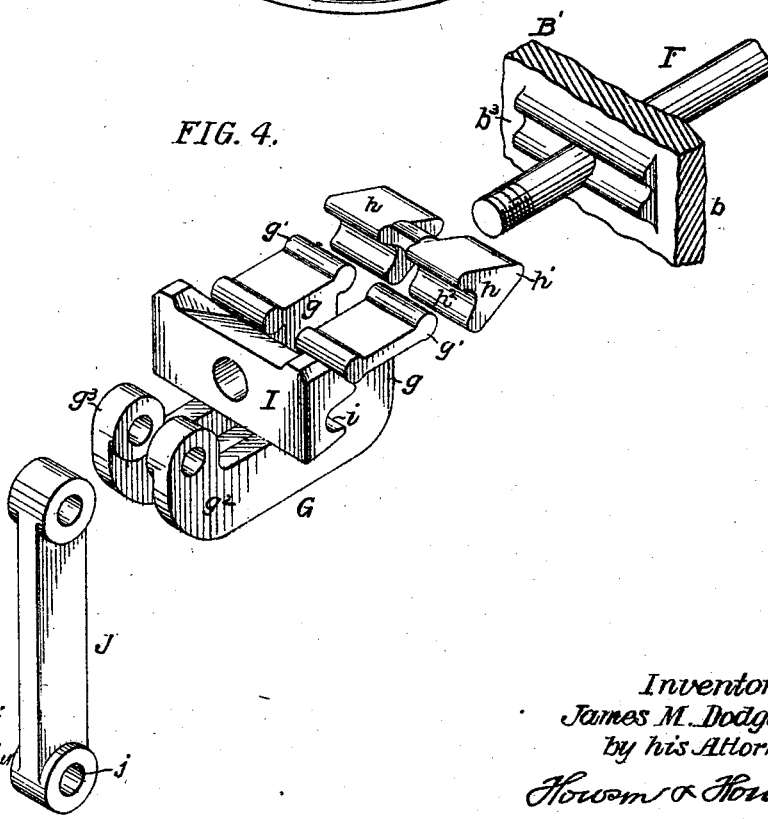

Referring to the accompanying drawings, Figure 1 is a longitudinal sectional view of my improved friction-clutch. Fig. 2 is a view looking in the direction of the arrow 2, Fig. 1. Fig. 3 is a view looking in the direction of the arrow 3, Fig. 1. Fig. 4 is a detached perspective view of the gripping-levers. Figs. 5 and 6 are diagrams illustrating the action of the levers.

The clutch shown in the drawings is arranged to couple a driven to a driving shaft in line, but it will be understood that the clutch may be mounted on the driving-shaft or driven shaft, and the casing may be used as a pulley or may have gear-teeth on its periphery without departing from my invention, or the wheel or pulley may be formed on either of the elements of the clutch.

A is the driving-shaft and B is the driven shaft. Secured to the shaft A is a clutch-head A' having teeth $a$, and keyed to the shaft B is a carrier B' for the clutching mechanism.

D is a disk mounted on a sleeve D', adapted to the end of the shaft B in the present instance. The disk D has teeth $d$ which engage with the teeth $a$ on the clutch-head A'. The teeth $a$ and $d$ are so arranged that they allow for the slight movement of the disk when engaged by the clutching mechanism.

The disk D has a series of orifices in the present instance, as shown in Fig. 1 and by dotted lines in Fig. 3, and I mount in these orifices blocks $d'$, of wood or other material. These blocks extend beyond each face of the disk, as shown in Fig. 1, so that the friction mechanism will engage with them and not with the disk. When they become worn they can be readily replaced.

At one side of the disk D is the web $b$ of the carrier B', and on the opposite side is a clutch-ring $d$. The periphery of the ring is notched at $e$, and adapted to these notches are tongues $b^2$ on the rim $b'$ of the carrier B', thus insuring the turning of the ring with the carrier. In the drawings I have shown a series of operating-bolts F connected to a series of levers, but as these bolts and levers are simply duplicates of one another I will simply describe one set. Each bolt is screwed into the ring and through the web of the carrier B', and mounted on each bolt between the ring and the web is a spring $f$. These springs tend to force the ring away from the friction-disk.

Each lever G has its fulcrum at $i$ in a block I carried by the bolt F. The block is held in position by nuts $f'$ on the bolt. The portion $g$ of the lever G and the lever $h$ form a knuckle-joint, the lever $h$ having its fulcrum at $h'$ in pockets $b^3$ in the web $b'$ of the carrier B', the portion $g$ of the lever G having a knuckle $g'$, adapted to a socket $h^2$ in the lever H.

The portion $g^2$ of the lever G extends back of the bolt F, as shown clearly in Fig. 1, and is bent so as to bring the pivoted point $g^3$ near the center line of the bolt. This arm of the lever is connected to a link J, pivoted at $j$ to an operating-sleeve J', adapted to slide on the shaft B.

The parts are so set in the present instance that when the operating-sleeve J' is forced toward the carrier B' the parts of the knuckle-joint are on the line $y$ and the link J is on a line $x$ at right angles to the line $y$, and by moving the pivoted point $j$ beyond the line $x$, as indicated in Figs. 1 and 6, the lever will be locked without materially releasing the clutching-disk, as the movement at the knuckle-joint, owing to the arrangement of the lever, is very slight.

When it is wished to release the clutch, the sleeve is turned back from the carrier and the parts assume the position shown in the diagram Fig. 5.

I have shown four sets of clutching-levers; but it will be understood that any number may be used without departing from my invention, the construction depending upon the size of the clutch.

I claim as my invention—

1. The combination in a friction-clutch, of the carrier, the clutching-ring, the disk mounted between the carrier and ring, with a series of levers G and h forming knuckle-joints, blocks carried by the ring and to which the levers G are pivoted, each lever having a rearward extension, a link pivoted to each extension, and an operating-sleeve to which the links are pivoted, substantially as described.

2. The combination in a friction-clutch, of the carrier, the clutching-ring, the friction-disk mounted between the ring and the carrier, bolts on the ring passing through the carrier, a series of levers G and h forming knuckle-joints, said carrier having sockets for the levers h, blocks carried by the bolts and having sockets for the levers G, each lever G having a rearward extension, a link pivoted to each extension back of the bolt, and an operating-sleeve to which the links are pivoted, said operating-sleeve being so adjusted in respect to the pivot-points of the links and levers that it can be moved past a line at right angles with the center lines of the levers so as to lock the parts in their adjusted positions, substantially as described.

3. The combination of the carrier, the clutching-ring having bolts adapted to pass through the carrier, a disk mounted between the ring and carrier, adjustable blocks I carried by the bolts, levers G adapted to sockets in the blocks I and having knuckles $g'$, levers h having sockets adapted to the knuckles and bearing in pockets on the carriers, links J pivoted to the levers G and an operating-sleeve to which said links are pivoted, substantially as described.

In testimony whereof I have signed my name to this specification in the presence of two subscribing witnesses.

JAMES M. DODGE.

Witnesses:
MURRAY C. BOYER,
JOSEPH H. KLEIN.